(12) United States Patent
Bahr

(10) Patent No.: US 10,893,447 B2
(45) Date of Patent: Jan. 12, 2021

(54) SYSTEMS AND METHODS FOR IMPROVED WI-FI COEXISTENCE WITH RADAR

(71) Applicant: CABLE TELEVISION LABORATORIES, INC, Louisville, CO (US)

(72) Inventor: John C. Bahr, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 19 days.

(21) Appl. No.: 16/252,156

(22) Filed: Jan. 18, 2019

(65) Prior Publication Data

US 2019/0223067 A1 Jul. 18, 2019

Related U.S. Application Data

(60) Provisional application No. 62/618,788, filed on Jan. 18, 2018.

(51) Int. Cl.
| | |
|---|---|
| H04W 16/10 | (2009.01) |
| H04W 36/06 | (2009.01) |
| H04W 36/20 | (2009.01) |
| H04W 72/04 | (2009.01) |
| H04W 36/32 | (2009.01) |
| H04W 74/08 | (2009.01) |
| G01S 19/01 | (2010.01) |
| H04W 16/14 | (2009.01) |

(52) U.S. Cl.
CPC .......... *H04W 36/06* (2013.01); *H04W 36/20* (2013.01); *H04W 36/32* (2013.01); *H04W 72/0453* (2013.01); *H04W 74/0825* (2013.01); *G01S 19/01* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 9,439,197 B1* | 9/2016 | Ngo ....................... | H04W 16/14 |
| 9,635,649 B1* | 4/2017 | Amiri ................... | H04W 16/14 |
| 2004/0156336 A1* | 8/2004 | McFarland .......... | H04W 72/02 370/329 |
| 2005/0215266 A1* | 9/2005 | Tsien ................... | H04W 16/14 455/454 |
| 2009/0028097 A1* | 1/2009 | Patel ..................... | H04W 16/14 370/329 |
| 2016/0073403 A1* | 3/2016 | Kloper ..................... | H04L 1/00 370/329 |
| 2017/0026845 A1* | 1/2017 | Garg ..................... | H04W 16/10 |
| 2017/0034707 A1* | 2/2017 | Green ................... | H04W 16/10 |

(Continued)

*Primary Examiner* — Sithu Ko
(74) *Attorney, Agent, or Firm* — Armstrong Teasdale LLP

(57) ABSTRACT

A wireless transceiver includes an access point and a dynamic frequency selection unit. The access point is configured to wirelessly communicate with at least one Wi-Fi user equipment and monitor a target band for energy signatures of a radio frequency operation within the target band. The dynamic frequency selection unit is configured to (i) receive a detected energy signature from the target band, (ii) determine whether the detected energy signature corresponds to a known radio frequency operation within a vicinity of a location of the access point or represents a false positive, and (iii) control the operation of the access point within the target band based on the determination.

20 Claims, 3 Drawing Sheets

(56) References Cited

U.S. PATENT DOCUMENTS

| | | | |
|---|---|---|---|
| 2017/0041954 A1* | 2/2017 | Tsai | H04W 16/14 |
| 2017/0048694 A1* | 2/2017 | Nafe | H04L 67/303 |
| 2017/0048864 A1* | 2/2017 | Ngo | H04L 67/104 |
| 2017/0156149 A1* | 6/2017 | Lin | H04W 72/0453 |
| 2020/0015091 A1* | 1/2020 | Taskin | H04W 72/0426 |

* cited by examiner

SYSTEMS AND METHODS FOR IMPROVED WI-FI COEXISTENCE WITH RADAR

CROSS REFERENCE TO RELATED APPLICATIONS

This application claims the benefit of and priority to U.S. Provisional Patent Application Ser. No. 62/618,788, filed Jan. 18, 2018, which is incorporated herein by reference in its entirety.

BACKGROUND

The field of the disclosure relates generally to management of shared wireless communications, and more particularly, to wireless communication coexistence in spectra utilizing radar communications.

Conventional wireless communication systems utilize the 2.4 GHz, 3.5 GHz, and 5 GHz frequency bands for technologies such as Wi-Fi, Bluetooth, Zigbee, and a range of other consumer, industrial, and medical wireless technologies. Some portions of these frequency bands include unlicensed shared spectra, and other technology platforms are also known to share spectra in other frequency ranges. The available wireless spectrum is becoming more intensively shared as demand for wireless technologies increases. In some instances, spectral bands may be strictly licensed to specific access technologies, and are not generally available to other access technologies within the same spectrum.

Some conventional shared spectrum technology systems utilize algorithm- and sensing-based distributed access, which enable common use of a wireless resource, despite a lack of active coordination among users. For example, typical Wi-Fi systems employ a carrier sense multiple access with collision avoidance (CSMA/CA) network multiple access method, which is also known as "listen-before-talk" (LBT), in which carrier sensing is used, but nodes attempt to avoid collisions by transmitting only when the channel is sensed to be idle (not being used). Wi-Fi devices employ a common, standards-based protocol to avoid interference among themselves and other users, which provides a substantially equal probability of access across all users in channel conditions.

The rapidly-increasing prevalence of Wi-Fi devices and technology has significantly increased the traffic load throughout the spectral bands in which the devices operate, such as the Unlicensed National Information Infrastructure (UNIT) bands. In an effort to reduce congestion in the 5 GHz UNII-1 and UNII-3 bands, Dynamic Frequency Selection (DFS) was introduced to allow Wi-Fi transmissions to coexist with radar. DFS is a spectrum-sharing mechanism that allows wireless local area networks (WLANs) and wireless access points (APs) to coexist with radar systems. DFS operates to automatically select a frequency that does not interfere with a radar system operating in the 5 GHz band. More specifically, DFS allows a Wi-Fi AP to listen on DFS channels in the UNII-2 and UNII-2 Extended bands and, if a radar signature is not detected (e.g., after a given duration), a W-Fi transmission (e.g., an IEEE 802.11 protocol) from the AP may use those UNII channels.

Conventional DFS techniques provide subroutines in the AP software to search for radar pulses in the particular frequency channel, or during an autochannel scan, such as by monitoring errors in received frames and/or analyzing timing patterns for periodicity. If the pattern matches a radar signal, the wireless technology discontinue operations on the channel and switches to another frequency (i.e., a band without radar interference), and moves the wireless network to another frequency with no interference. Conventional DFS techniques, however, are frequently subject to false positives; the DFS process of the Wi-Fi AP "thinks" it sees a radar radio frequency (RF) "signature" where no radar RF actually exists or operates.

Accordingly, improved DFS techniques are desired that reduce or eliminate false positives.

BRIEF SUMMARY

In an embodiment, a wireless transceiver includes an access point and a dynamic frequency selection unit. The access point is configured to wirelessly communicate with at least one Wi-Fi user equipment and monitor a target band for energy signatures of a radio frequency operation within the target band. The dynamic frequency selection unit is configured to (i) receive a detected energy signature from the target band, (ii) determine whether the detected energy signature corresponds to a known radio frequency operation within a vicinity of a location of the access point or represents a false positive, and (iii) control the operation of the access point within the target band based on the determination.

In an embodiment, a method for verifying accuracy a dynamic frequency selection process by an access point is provided. The access point includes a processor and a transceiver. The method includes steps of monitoring a selected channel of a target band, detecting a radio frequency signature operating within the monitored selected channel, performing a lookup operation to determine a geographic location of the access point, searching for a known incumbent installation that (i) corresponds to the detected radio frequency signature, and (ii) is disposed within a vicinity of the geographic location of the access point. The method further includes steps of determining, based on a result of the step of searching, whether the detected radio frequency signature is represents one of a operational incumbent installation and a false positive, and controlling an operation of the access point within the selected channel based on the step of determining.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
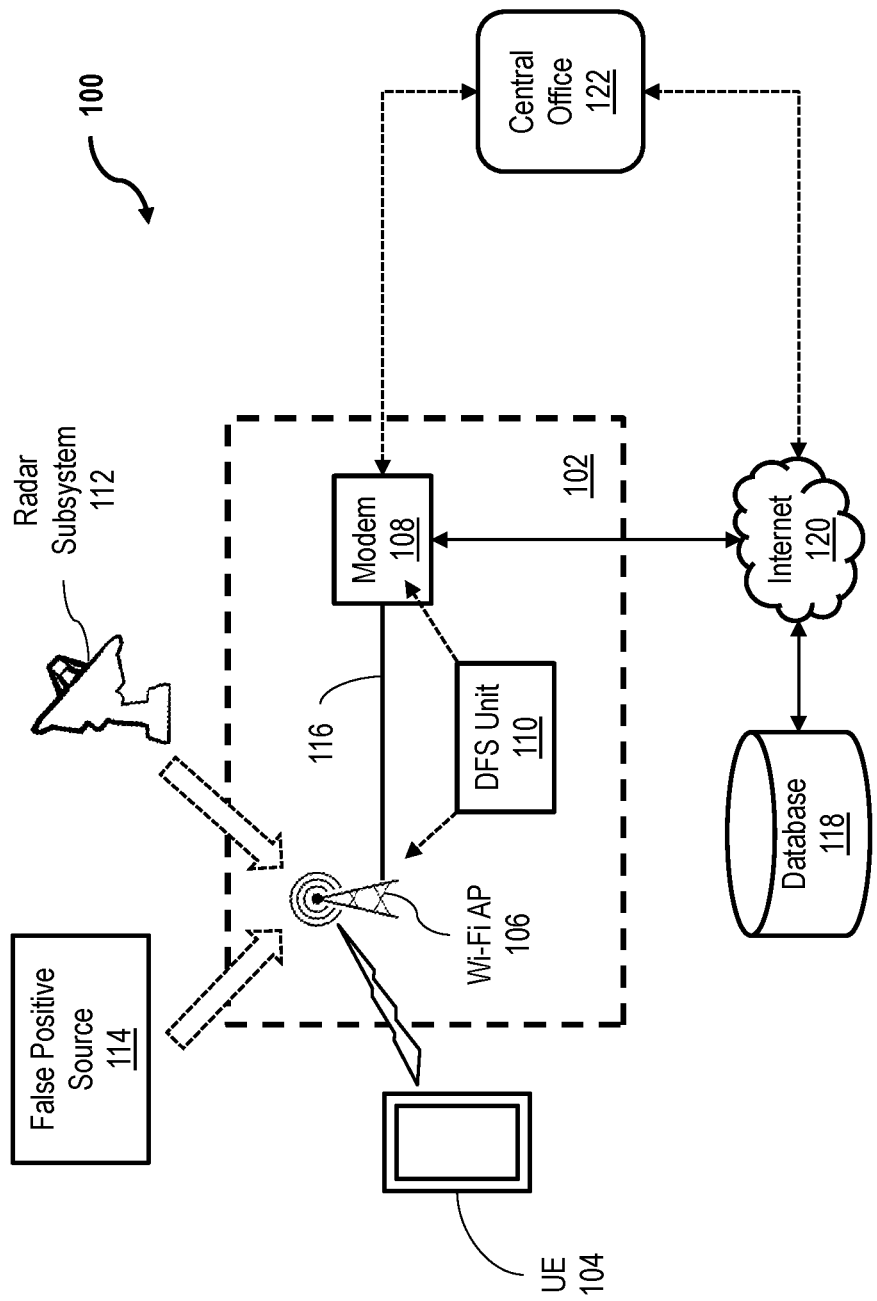
FIG. 1 is a schematic illustration of a wireless communication system employing dynamic frequency selection, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, the phrase "user equipment" includes an electronic device or system utilizing an aggressive, non-cooperative technology protocol, such as LTE. The phrase "Wi-Fi device" includes an electronic device, such as a station (or STA), that has the capability to use one of the existing 802.11 protocols. For example, a Wi-Fi device can include, without limitation, one or more of a laptop, a desktop personal computer (PC), personal digital assistant (PDA), AP, and a Wi-Fi phone/smartphone. The Wi-Fi device may be fixed, mobile, or portable, and includes a transceiver or transmitter/receiver combination, an 802.11-conformant media access control (MAC) and physical layer (PHY) interface to a wireless medium (WM).

As used herein, "modem termination system," or "MTS," may refer to one or more of a cable MTS (CMTS), an optical network terminal (ONT), an optical line terminal (OLT), a network termination unit, a satellite termination unit, and/or other termination devices and systems. Similarly, "modem" may refer to one or more of a cable modem (CM), customer premises equipment (CPE), an optical network unit (ONU), a digital subscriber line (DSL) unit/modem, a satellite modem, etc.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following description features systems and methods for allocating 802.11-type wireless communication technologies to coexist with radar technology in the same band. In an exemplary embodiment, the present techniques use the location information of the AP to more reliably verify whether a detected radar signature (e.g., a weather radar signature) is false. In some embodiments, systems and methods are provided which utilize one or more data points in an enhanced DFS process to eliminate a substantial majority of false positives.

For example, the present embodiments may obtain the location of the AP seeking to operate on a DFS channel through a GPS unit of the AP, or from an external source, such as a business support systems (BSS) location lookup. In some embodiments, an exemplary system may obtain the location of known radar installations through publicly accessible databases, a dedicated database, and/or a crowd-sourced database in operable communication with different nearby APs (e.g., the different APs capable of reporting knowledge of known nearby radar installations). A comparison of the AP location with locations of known radar operations in the same geographic vicinity may then more reliably allow the AP to determine whether a detected RF signature was actually a radar operation, or instead a false positive. In an embodiment, the present systems and methods may further utilize publicly available or crowd-sourced location and frequency data from weather radar operations to enable the AP to determine if an RF signature resembling a weather radar signature corresponds to a known weather radar operation in the vicinity.

In exemplary embodiments, a processor is configured with an algorithm for implementing an enhanced DFS coexistence process. This enhanced process, for example, may perform a location comparison and verification after a conventional DFS scan, but prior to switching operation to a different frequency band. For purposes of this discussion, the term "co-existent" refers to different devices or technologies re-using the same spectral resources within the same general geographical proximity to one another. Examples of technologies used in unlicensed spectra include Wi-Fi, Bluetooth, Zigbee, and Wi-Fi (i.e., 802.11/a/b/g/n/ac/ax/ad and other 802.11 variants), as well as other technologies implementing unlicensed shared access. Wi-Fi is generally considered a cooperative technology having coexistence features allowing the capability to determine the availability of a medium (e.g., by LBT) before accessing the corresponding channel.

As described herein, each of the adaptation techniques may be implemented alone, or in combination with one or more of the other systems and methods that are also described. In some embodiments, several of the present techniques may be implemented simultaneously, or in succession. The advantageous adaptation techniques are described further below with respect to several drawings.

FIG. 1 is a schematic illustration of a wireless communication system 100 employing dynamic frequency selection. System 100 includes a wireless subsystem 102 capable of wirelessly communicating with a user equipment (UE) 104 transmitting and/or receiving within the vicinity of wireless subsystem 102. In an exemplary embodiment, wireless subsystem 102 is includes a Wi-Fi AP 106, a modem 108, and a DFS unit 110. DFS unit 110 is configured to monitor a selected channel, such as a UNII channel, to detect an RF signature from a radar subsystem 112 within a geographical vicinity of wireless subsystem 102, or from a false positive source 114. In some embodiments, Wi-Fi AP 106 and modem 108 are separate devices, and in operable communication with one another over a communication medium 116 (e.g., Ethernet). In other embodiments, Wi-Fi AP 106 and modem 108 are integrated into a single device, and have transceiver capability. Similarly, DFS unit 110 may be a separate and distinct hardware unit, or may represent a software algorithm or package programmed into one or more of wireless subsystem 102, AP 106, and modem 108, and executed by a processor thereof (not shown in FIG. 1). In at least one embodiment, DFS unit 110 is a virtualized task of a virtualized network function (VNF).

In exemplary operation, DFS unit 110 functions to allow a receiver portion (not separately shown) of wireless subsystem 102 to monitor a selected channel to detect an RF signature from radar subsystem 112 or false positive source 114. Upon detection of the respective RF signature, and prior to switching to a non-interfering channel, DFS unit 110 executes one or more of (i) a location determination of Wi-Fi AP 106, and (ii) a search for known radar installations within the vicinity (i.e., a predetermined radius) of the determined location of Wi-Fi AP 106. The location determination may be performed, for example, using a GPS unit (not shown) integrated within Wi-Fi AP 106, and/or by performing a lookup operation (e.g., crowd-sourced) of external BSS locations. The radar installation search may then be performed, for example, by modem 108 (or an equivalent functional portion of wireless subsystem 102) accessing a database 118 (e.g., a public database) over an external electronic communication network 120 (e.g., the Internet, the Cloud, etc.). Database 118 may be updated dynamically in real-time, periodically (e.g., monthly), or upon query from modem 108 upon detection of an RF signature.

Access to Internet 120 may be direct, or indirect through a central office 122 (e.g., a hub, modem termination system (MTS), network operator, multiple systems operator (MSO) etc.) in operable communication therewith using a communication protocol, such as Data over Cable Service Interface Specification (DOCSIS). An algorithm of DFS unit 110 may then compare the AP location with known radar installation locations in the vicinity to determine whether the detected RF signature corresponds to a known radar installation. If the RF signature corresponds to a local radar installation, DFS unit 110 may cause Wi-Fi AP 106 to switch to a non-interfering channel according to conventional DFS techniques. If, however, the detected RF signature does not correspond to a known radar installation, DFS unit 110 may determine that the detected RF signature is a false positive, and continue operation on the selected channel. System 100 is illustrated schematically, and is not intended to represent the actual scale or proximity of the several elements depicted therein.

Figure 2:
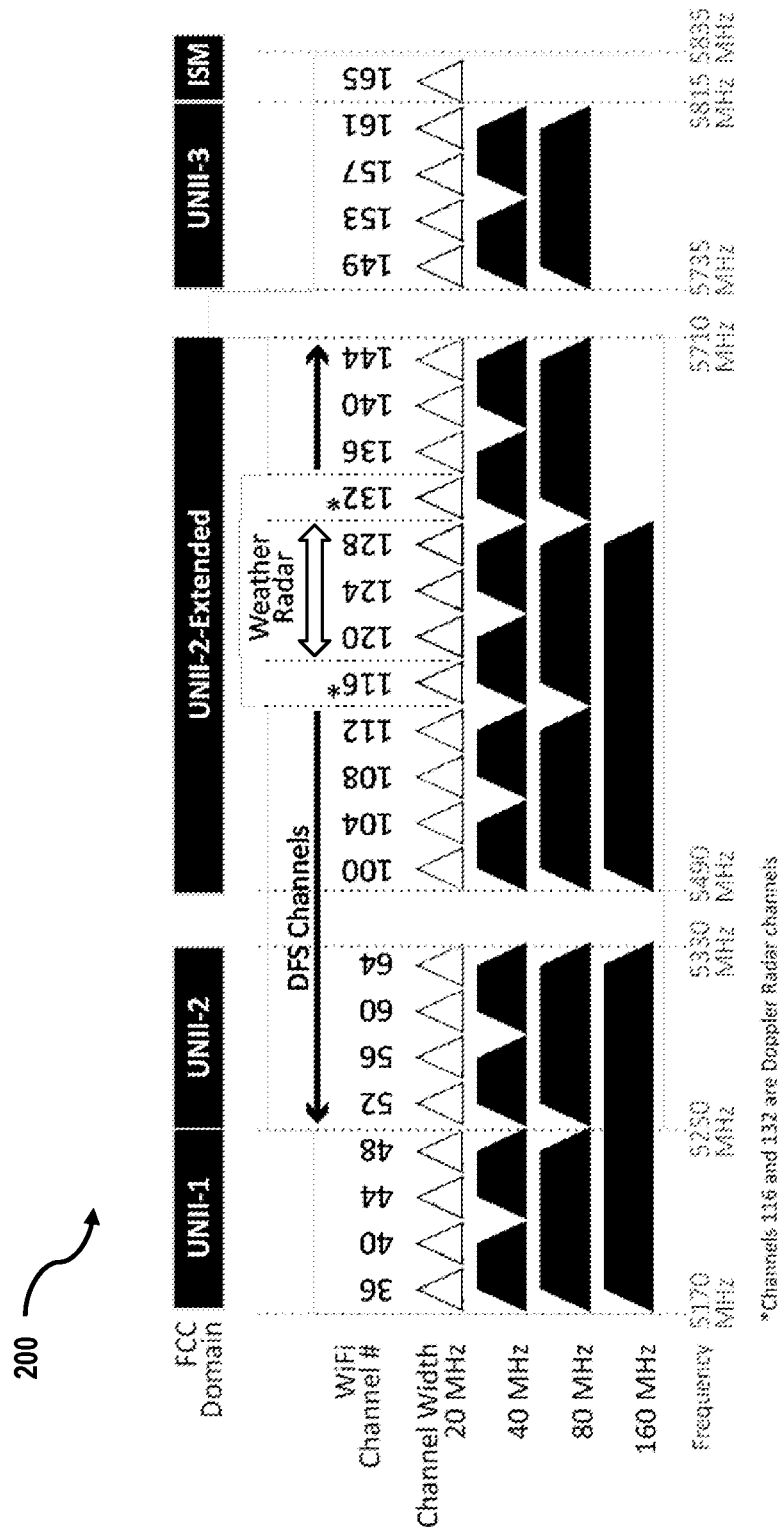
FIG. 2 is a graphical illustration depicting an exemplary channel allocation utilized by the system depicted in FIG. 1.

FIG. 2 is a graphical illustration depicting an exemplary channel allocation 200 utilized by system 100, FIG. 1. In the exemplary embodiment, channel allocation 200 represents an 802.11ac protocol channel allocation for UNII bands UNII-1, UNII-2, UNII-2 Extended, and UNII-3. As illustrated in FIG. 2, the UNII-2 and UNII-2 Extended band spectra represent DFS channels (i.e., channels 52 through 144) subject to the present techniques. At present, channels 120, 124, and 128 are specifically designated for weather radar, and channels 116 and 132 are Doppler radar channels that may be used in some cases. As described above, DFS unit 110, FIG. 1, is configured to perform a search for known radar installations corresponding to the detected RF signature that are located within the vicinity of the determined AP location. If the search results in no relevant match, DFS unit 110 may determine that the RF signature is a false positive, and avoid switching to a non-interfering channel.

Figure 3:
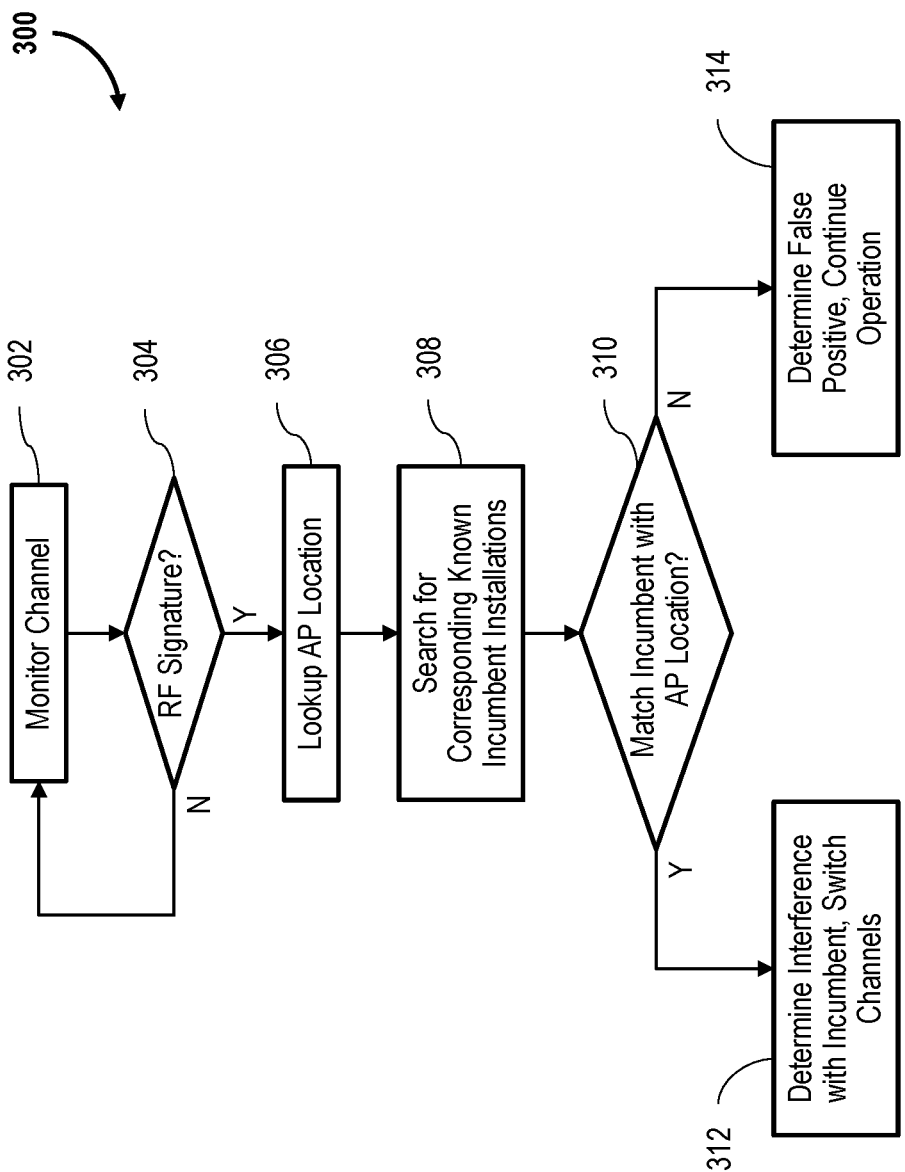
FIG. 3 is a flow chart diagram of an exemplary dynamic frequency selection process, according to an embodiment.

FIG. 3 is a flow chart diagram of an exemplary DFS process 300, which may be implemented with one or more of the embodiments described above. DFS process 300 is described with respect to a communication network such as that depicted in system 100, FIG. 1, and may be executed by a processor configured and/or programmed according to the functionality of DFS unit 110. Nevertheless, a person of ordinary skill in the art will understand the principles described herein are not limited to the exemplary spectral bands and channels described herein, or to only potential interference between Wi-Fi and radar. The present techniques may, for example, be applicable with respect to interference with other cooperative technologies, or by other incumbents, such as the C-band, coastal bands, etc.

In exemplary operation, DFS process 300 begins at step 302, in which an AP receiver or a receiving portion of a DFS unit (e.g., DFS unit 110, FIG. 1) monitors a selected channel in which an AP (e.g., Wi-Fi AP 106, FIG. 1), in communication with a Wi-Fi UE (e.g., UE 104, FIG. 1), wishes to operate. Step 304 is a decision step. In step 304, process 300 determines if an RF signature is detected on the monitored channel. If, in step 304, an RF signature is not detected, process 300 returns to step 302. If, however, in step 304, an RF signature is detected, process 300 proceeds to step 306.

In step 306, process 300 performs a look up operation (e.g., GPS, BSS, crowd-sourcing) to determine the AP location. In step 308, using the determined location of the AP, process 300 performs a search for known radar installations within the vicinity of the AP location that correspond to the detected RF signature. Step 310 is a decision step. In step 310, process 300 determines if there is a match for a known radar installation corresponding to the detected RF signature that is within the vicinity of the AP location. If a matching radar installation is found, process 300 process 300 proceeds to step 312, in which a determination is made that there is an interfering radar operation on the selected channel, and the AP is directed to switch operation to a non-interfering channel, in a manner similar to that of conventional DFS techniques. If, however, in step 310, a matching radar installation is not found within the vicinity of the AP location, process 300 instead proceeds to step 314, in which a determination is made that the detected RF signature is a false positive, and the AP is allowed to continue operation on the selected channel.

In contrast to the enhanced DFS process depicted in FIG. 3, it may be noted that a conventional DFS process would only include some form of steps 302, 304, and 312, and detection of an RF signature in step 304 would because the conventional DFS process to proceed directly from step 304 to step 312 upon detection of an RF signature. That is, no further determination would be made whether the detected signature corresponds to a known radar installation, as opposed to a false positive. Process 300 is therefore significantly advantageous over conventional DFS processing techniques.

More specifically, implementation of systems and methods according to the embodiments described herein by, for example, a cable operator or MSO (e.g., in the CPE equipment thereof), the respective operator would be enabled to better utilize the UNII-2/UNII-2 Extended bands, thus giving the operator's customers a significantly improved Wi-Fi experience by spreading out their Wi-Fi AP operation across 25 5 GHz channels (in this example), instead of the only 9 5 GHz channels conventionally available. Thus, according to the present embodiments, an operator may realize as much as a 178% increase in channel utilization.

Therefore, according to exemplary systems and methods described herein, operators and Wi-Fi users will achieve significantly improved efficiency of available bandwidth, and avoid wasting unused bandwidth available bandwidth due to false positives of RF signatures.

The present embodiments are therefore of advantageous use with respect to applications for 3GPP, 5G, unlicensed bands such as unlicensed long term evolution (LTE-U) and unlicensed new radio (NR-U), and particularly four such applications utilizing the 5 GHz spectrum. The person of ordinary skill in the art will understand that the radar examples described herein are provided a way of example, for purposes of illustration, and are not intended to be limiting. For example, the present systems and methods will be understood to be further applicable with respect to other incumbents, such as the C-band, coastal communication bands, etc.

Exemplary embodiments of shared access communication management systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wireless transceiver, comprising:
   an access point (AP) configured to wirelessly communicate with at least one Wi-Fi user equipment (UE) and monitor a target band for energy signatures of a radio frequency (RF) operation within the target band; and
   a dynamic frequency selection (DFS) unit configured to (i) receive a detected energy signature from the target band, (ii) obtain a location of the AP, (iii) perform a matching search for a known RF operation corresponding to the detected energy signature within a vicinity of the location of the AP, (iv) determine from the matching search that the detected energy signature does not correspond to a known RF operation within the vicinity of the AP and represents a false positive, and (v) cause the AP to operate on a communication channel within the target band, based on the determination, without switching to a different channel.

2. The transceiver of claim 1, wherein the DFS unit is further configured to obtain the location of the AP using a lookup operation to verify the location of the AP.

3. The transceiver of claim 2, wherein the DFS unit is further configured to implement the lookup operation by querying a GPS unit of the AP.

4. The transceiver of claim 2, further comprising a modem in operable communication with the DFS unit and at least one database, and wherein the DFS unit is further configured to perform the matching search by querying one of a business support system and the at least one database through the modem.

5. The transceiver of claim 4, wherein the modem comprises at least one of a customer premises equipment, a cable modem, an optical network unit, a digital subscriber line unit/modem, and a satellite modem.

6. The transceiver of claim 4, wherein the at least one database is external to the transceiver, and wherein the modem is configured to query the at least one database over an electronic communications network.

7. The transceiver of claim 6, wherein electronic communications network is the Internet, and wherein the modem is in operable communication with the Internet (i) directly, or (ii) indirectly through a central office of a network operator.

8. The transceiver of claim 4, wherein the DFS unit is further configured to perform the matching search by searching the at least one database for known incumbent installations that correspond to the detected RF energy signature.

9. The transceiver of claim 4, wherein the DFS unit is further configured to perform the matching search by querying different APs that are located relatively near to the wireless transceiver.

10. The transceiver of claim 8, wherein the target band is an unlicensed national information infrastructure (UNIT) band.

11. The transceiver of claim 10, wherein the UNIT band is one of a UNII-2 band and a UNII-2 Extended band.

12. The transceiver of claim 10, wherein a known incumbent installation corresponding to the detected RF energy signature is a radar installation.

13. A method for verifying accuracy a dynamic frequency selection (DFS) process by an access point (AP), the AP including a processor and a transceiver, the method comprising the steps of:
    monitoring a selected channel of a target band;
    detecting a radio frequency (RF) signature operating within the monitored selected channel;
    performing a lookup operation to determine a geographic location of the AP;
    searching for a known incumbent installation that (i) corresponds to the detected RF signature, and (ii) is disposed within a vicinity of the geographic location of the AP;
    determining, based on a result of the step of searching, that the detected RF signature represents a false positive; and
    controlling an operation of the AP, based on the step of determining, to operate on the selected channel of the target band without switching to a different channel.

14. The method of claim 13, wherein the step of performing a lookup operation comprises querying a GPS unit of the AP.

15. The method of claim 13, wherein the step of searching comprises querying at least one of a business support system and an external public database.

16. A method for verifying accuracy a dynamic frequency selection (DFS) process by an access point (AP), the AP including a processor and a transceiver, the method comprising the steps of:
- monitoring a selected channel of a target band;
- detecting a radio frequency (RF) signature operating within the monitored selected channel;
- performing a lookup operation to determine a geographic location of the AP;
- searching for a known incumbent installation that (i) corresponds to the detected RF signature, and (ii) is disposed within a vicinity of the geographic location of the AP;
- determining, based on a result of the step of searching, whether the detected RF signature is represents one of a operational incumbent installation and a false positive; and
- controlling an operation of the AP within the selected channel based on the step of determining,
- wherein the step of searching comprises a crowd-sourcing query to different neighboring APs.

17. The method of claim 13, wherein the selected channel is a DFS channel of an unlicensed national information infrastructure (UNIT) band.

18. The method of claim 17, wherein the UNIT band is one of a UNII-2 band and a UNII-2 Extended band.

19. The method of claim 17, wherein the operational incumbent installation is a radar installation.

20. The method of claim 13, wherein the operational incumbent installation transmits over the C-band.

* * * * *